(12) United States Patent
Uchiyama et al.

(10) Patent No.: US 9,768,458 B2
(45) Date of Patent: Sep. 19, 2017

(54) CONTROL DEVICE OF FUEL CELL, FUEL CELL SYSTEM AND CONTROL METHOD OF FUEL CELL

(75) Inventors: Tomoaki Uchiyama, Sunto-gun (JP); Masato Nakajima, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/423,212

(22) PCT Filed: Aug. 31, 2012

(86) PCT No.: PCT/JP2012/005527
§ 371 (c)(1),
(2), (4) Date: Feb. 23, 2015

(87) PCT Pub. No.: WO2014/033790
PCT Pub. Date: Mar. 6, 2014

(65) Prior Publication Data
US 2015/0244013 A1    Aug. 27, 2015

(51) Int. Cl.
*H01M 8/04858* (2016.01)
*H01M 8/04828* (2016.01)
(Continued)

(52) U.S. Cl.
CPC ..... *H01M 8/04932* (2013.01); *H01M 8/0485* (2013.01); *H01M 8/0494* (2013.01); *H01M 8/04492* (2013.01); *H01M 8/04529* (2013.01); *H01M 8/04574* (2013.01); *H01M 8/04582* (2013.01); *H01M 8/04604* (2013.01); *H01M 8/04664* (2013.01); *H01M 8/04679* (2013.01);
(Continued)

(58) Field of Classification Search
CPC ............... H01M 8/10; H01M 8/04119; H01M 8/04126; H01M 8/04679; H01M 8/04932; H01M 8/0485; H01M 8/04947; H01M 8/04992; H01M 8/04529; H01M 8/04582; H01M 8/04604; H01M 8/04671; H01M 8/04492; H01M 8/04574; H01M 8/04664; H01M 8/0494
See application file for complete search history.

(56) References Cited

U.S. PATENT DOCUMENTS 6,828,353 B1 * 12/2004 Charnock ............ C08G 65/485
429/209
2004/0185315 A1    9/2004 Enjoji et al.
(Continued)

FOREIGN PATENT DOCUMENTS

JP    2004-199988 A    7/2004
JP    2005-071797 A    3/2005
(Continued)

*Primary Examiner* — Stephen Yanchuk
(74) *Attorney, Agent, or Firm* — Andrews Kurth Kenyon LLP

(57) ABSTRACT

A fuel cell has an electrolyte membrane of 5 to 10 μm in thickness. A control device for this fuel cell comprises: a controller configured to control an amount of power generation by the fuel cell according to a required amount of electric power; and a power generation reducer configured to reduce the amount of power generation by the fuel cell at a humidity of an electrolyte membrane of 95 to 98% RH to be lower than the amount of power generation at the humidity of the electrolyte membrane of lower than 95% RH.

3 Claims, 5 Drawing Sheets

(51) Int. Cl.
  *H01M 8/04492* (2016.01)
  *H01M 8/04537* (2016.01)
  *H01M 8/04992* (2016.01)
  *H01M 8/04664* (2016.01)
  *H01M 8/1018* (2016.01)

(52) U.S. Cl.
  CPC .... *H01M 8/04947* (2013.01); *H01M 8/04671* (2013.01); *H01M 8/04992* (2013.01); *H01M 2008/1095* (2013.01)

(56) References Cited

U.S. PATENT DOCUMENTS

| | | | |
|---|---|---|---|
| 2006/0014074 A1* | 1/2006 | Tsuji | H01M 8/04089 429/49 |
| 2006/0115699 A1 | 6/2006 | Matsuoka | |
| 2006/0257698 A1 | 11/2006 | Ishikawa et al. | |
| 2007/0122662 A1* | 5/2007 | Budinski | H01M 4/8657 429/413 |
| 2009/0076661 A1* | 3/2009 | Pearson | H01M 8/04619 700/291 |
| 2011/0229785 A1 | 9/2011 | Song et al. | |
| 2013/0035898 A1* | 2/2013 | Preston | H01M 8/04507 702/183 |

FOREIGN PATENT DOCUMENTS

| | | |
|---|---|---|
| JP | 2007-115490 A | 5/2007 |
| JP | 2009-123512 A | 6/2009 |
| JP | 2009-224295 A | 10/2009 |
| JP | 2011-198737 A | 10/2011 |
| JP | 2012-015120 A | 1/2012 |
| JP | 2012-084264 A | 4/2012 |
| JP | 2012-129081 A | 7/2012 |

* cited by examiner

CONTROL DEVICE OF FUEL CELL, FUEL CELL SYSTEM AND CONTROL METHOD OF FUEL CELL

CROSS-REFERENCE TO RELATED APPLICATION

This is a national phase application based on the PCT International Patent Application No. PCT/JP2012/005527 filed Aug. 31, 2012, the entire contents of which are incorporated herein by reference.

TECHNICAL FIELD

The present invention relates to control of a fuel cell.

BACKGROUND ART

In order to suppress deterioration of an electrolyte membrane included in a fuel cell, for example, a technique disclosed in Patent Literature 1 calculates a creep deformation amount of the electrolyte membrane and its cumulative value from the temperature or the humidity of the electrolyte membrane and gives a warning when the cumulative value exceeds a predetermined value. The technique described in Patent Literature 1 suppresses the electrolyte membrane from being dried and cracked by giving a warning.

CITATION LIST

Patent Literature

[PTL 1] JP 2012-84264A
[PTL 2] JP 2005-71797A
[PTL 3] JP 2012-15120A

SUMMARY

Technical Problem

The fuel cell may be deteriorated by various causes. For example, when the high humidity condition continues, the electrolyte membrane may be swollen and deformed (buckled). This may generate a stress in catalyst layers joined with the electrolyte membrane and cause cracks in the catalyst layers. The cracks in the catalyst layers may cause a tensile stress to be applied to some areas of the electrolyte membrane adjacent to the cracks during contraction of the electrolyte membrane and may cause the electrolyte membrane to be stretched and partly thinned. Accordingly, a technique of suppressing deterioration of not only the electrolyte membrane but the catalyst layers has been needed. This problem is especially significant in fuel cells employing thin electrolyte membrane for the purpose of cost reduction. Other needs with regard to the conventional fuel cell include reduction of the manufacturing cost, downsizing and improvement in efficiency of power generation.

Solution to Problem

The invention may be implemented by any of the following aspects, in order to solve at least part of the above problems.

(1) According to one aspect of the invention, there is provided a control device for a fuel cell. The control device comprises: a controller configured to control an amount of power generation by the fuel cell according to a required amount of electric power; and a power generation reducer configured to reduce the amount of power generation by the fuel cell at a humidity of an electrolyte membrane, which is included in the fuel cell and is formed to have a thickness of 5 to 10 µm, of 95 to 98% RH to be lower than the amount of power generation at the humidity of the electrolyte membrane of lower than 95%. Even when the thin electrolyte membrane of 5 to 10 µm is swollen at the humidity of 95 to 98% RH, the control device of this aspect reduces the amount of power generation by the fuel cell and thereby accelerates drying of the electrolyte membrane. This accordingly suppresses the occurrence of cracking in a catalyst layer joined with the electrolyte membrane and the occurrence of cross leakage due to thinning of the electrolyte membrane accompanied with cracking in the catalyst layer.

(2) In the control device for the fuel cell of the above aspect, the controller may control an amount of electric power to be supplied from a secondary battery, while controlling the amount of power generation by the fuel cell, according to the required amount of electric power. When the power generation reducer reduces the amount of power generation by the fuel cell, the controller may control the secondary battery to supply a deficient amount of electric power in the required amount of electric power, which is made deficient by reducing the amount of power generation. The control device of this aspect causes the deficient amount of electric power, which is made deficient by reducing the amount of power generation of the fuel cell, to be supplied from the secondary battery and thus ensures adequate supply of the required amount of electric power.

(3) The control device for the fuel cell of the above aspect may further comprise a cracking detector configured to detect cracking in a catalyst layer of the fuel cell. In response to detection of cracking in the catalyst layer, the controller may control the fuel cell to make power generation according to the required amount of electric power, regardless of the humidity of the electrolyte membrane. When cracking occurs in the catalyst layer, the fuel cell of this aspect swells the electrolyte membrane and does not contract the electrolyte membrane. This suppresses the electrolyte membrane from being stretched and thinned by cracking in the catalyst layer during contraction of the electrolyte membrane. As a result, this suppresses the occurrence of cross leakage in the electrolyte membrane in the state that cracking occurs in the catalyst layer.

(4) In the control device for the fuel cell of the above aspect, the cracking detector may measure a frequency of strains in the catalyst layer based on the humidity of the electrolyte membrane and may detect cracking in the catalyst layer based on the measured frequency. The control device of this aspect can estimate both the swelling of the electrolyte membrane and the cracking of the catalyst layer, based on the humidity of the fuel cell.

(5) The control device for the fuel cell of the above aspect may further comprise a humidity estimator configured to estimate the humidity, based on a current value of the fuel cell. The control device of this aspect can estimate the humidity based on the current value. This simplifies the system configuration.

(6) In the control device for the fuel cell of the above aspect, the power generation reducer may set a value of electric current for power generation of the fuel cell to 0.1 $A/cm^2$, in order to reduce the amount of power generation of the fuel cell. The control device of this aspect enables the electrolyte membrane to be quickly dried, while suppressing the fuel cell from having an unnecessarily high potential.

(7) According to another aspect of the invention, there is provided a fuel cell system. This fuel cell system comprises the fuel cell and the control device. The fuel cell system of this aspect has the similar advantageous effects to those of the control device described above.

The invention is not limited to the control device for the fuel cell or the fuel cell system described above but may be implemented by any of various other aspects: for example, a vehicle equipped with the fuel cell system, a control method of a fuel cell, a computer program for implementing the control method and a non-transitory storage medium in which the computer program is stored.

DESCRIPTION OF EMBODIMENTS

Figure 1:
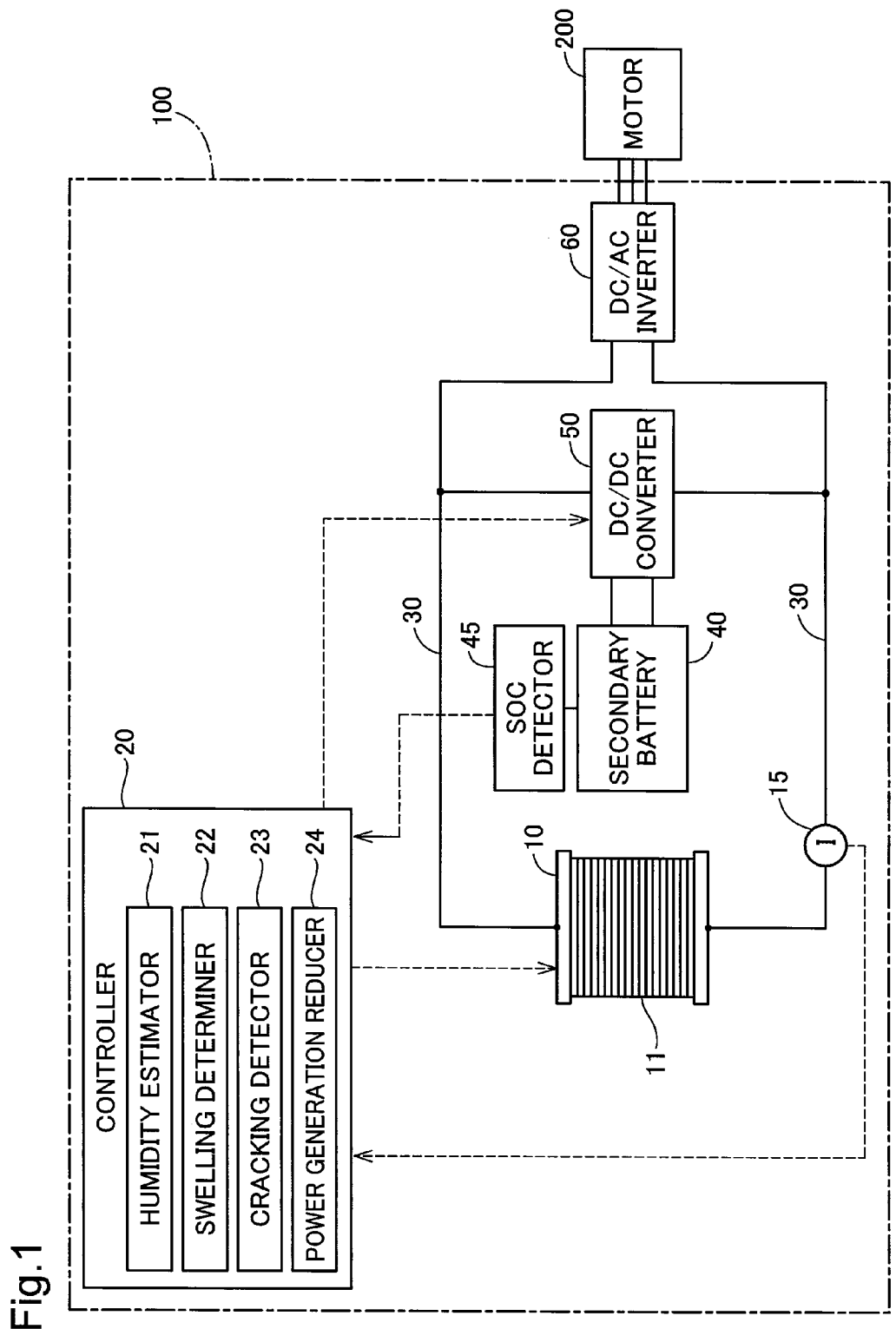
FIG. 1 is a diagram illustrating the general configuration of a fuel cell system.

FIG. 1 is a diagram illustrating the general configuration of a fuel cell system 100 according to one embodiment of the invention. The fuel cell system 100 is a system mounted on, for example, a fuel cell vehicle to supply electric power to a motor 200 in response to the driver's demand. The fuel cell system 100 includes a fuel cell 10, a current sensor 15, a controller 20, a secondary battery 40, an SOC detector 45, a DC-DC converter 50 and a DC-AC inverter 60. The controller 20 corresponds to the "control device" of this application.

The fuel cell 10 serves as a power supply source to the motor 200. The fuel cell 10 of this embodiment is a polymer electrolyte fuel cell which receives supplies of hydrogen (anode gas) and the air (cathode gas) as reactive gases and generates electric power. The fuel cell 10 has stack structure by stacking a plurality of power generating elements 11 which are also called unit cells. As is known in the art, each of the power generating elements 11 has a membrane electrode assembly (MEA) in which catalyst layers are joined with both surfaces of an electrolyte membrane, gas diffusion layers placed on the respective surfaces of the membrane-electrode assembly and two separators arranged to place the membrane electrode assembly therebetween across the gas diffusion layers. According to this embodiment, the thickness of the electrolyte membrane is 5 to 10 µm. Since the structure of the fuel cell 10 is known in the art, FIG. 1 does not specifically show flow paths for supplying the reactive gases to the fuel cell 10. The supply amounts of the reactive gases to the fuel cell 10 are controlled by the fuel cell 10.

The fuel cell 10 is connected with the DC-AC inverter 60 via a DC line 30. The DC-AC inverter 60 is connected with the motor 20. The DC line 30 is connected with the current sensor 15. The current sensor 15 measures the current value output from the fuel cells 10 and sends the measurement result to the controller 20.

The secondary battery 40 is connected with the DC line 30 via the DC-DC converter 50. The secondary battery 40, along with the fuel cell 10, serves as the power supply source to the motor 200. The secondary battery 40 is, for example, a lithium ion battery. The controller 20 controls the DC-DC converter 50, so as to control the current value and the voltage value for power generation of the fuel cell 10 and charge-discharge of the secondary battery 40.

The secondary battery 40 is connected with the SOC detector 45. The SOC detector 45 detects the SOC (state of charge) representing the charging state of the secondary battery 40 and sends the detection result to the controller 20. The SOC of the secondary battery 40 means the ratio of remaining amount of charge (stored amount) of the secondary battery 40 to the storage capacity of the secondary battery 40. The SOC detector 45 measures the temperature, electric power and electric current of the secondary battery 40, so as to detect the SOC of the secondary battery 40.

The DC-AC inverter 60 converts the DC power obtained from the fuel cell 10 and the secondary battery 40 into AC power and supplies the converted AC power to the motor 200. When regenerative power is generated by the motor 200, the DC-AC inverter 60 converts the regenerative power into DC power. The regenerative power converted into the DC power is accumulated in the secondary battery 40 via the DC-DC converter 50.

The controller 20 is implemented by a computer including a CPU and a memory. The controller 20 controls the amount of electric power to be supplied from the entire fuel cell system 100 to the motor 200 according to the output (amount of electric power) required by the driver to drive the motor 200. The controller 20 adjusts the distribution of the required output to the amount of power generation by the fuel cell 10 and the amount of electric power to be supplied from the secondary battery 40. For example, when reducing the amount of power generation by the fuel cell 10, the controller 20 causes the secondary battery 40 to compensate for the deficient amount of electric power due to reduction of the amount of power generation.

The CPU executes a predetermined program stored in the memory, so that the controller 20 serves as a humidity estimator 21, a swelling determiner 22, a cracking detector 23 and a power generation reducer 24.

The humidity estimator 21 estimates the humidity of the electrolyte membrane included in the fuel cell 10, based on the current value of the fuel cell 10 measured by the current sensor 15. A map representing a predetermined relationship between the current value of the fuel cell 10 and the humidity of electrolyte membrane is stored in the memory of the controller 20. The humidity estimator 21 refers to this map and estimates the humidity of the electrolyte membrane from the measured current value of the fuel cell 10.

The swelling determiner 22 determines whether the electrolyte membrane is swollen, based on the humidity of the electrolyte membrane estimated by the humidity estimator 21. According to this embodiment, the swelling determiner 22 determines that the electrolyte membrane is swollen when the estimated humidity of the electrolyte membrane is equal to or higher than 95% RH. The reason why the criterion for determination is set to 95% RH will be described later.

When it is determined that the electrolyte membrane is swollen, the power generation reducer 24 reduces the amount of power generation by the fuel cell 10 to be lower than the amount of power generation in the state that the electrolyte membrane is not swollen.

The cracking detector 23 estimates the frequency of strains in the catalyst layers, based on the humidity of the electrolyte membrane estimated by the humidity estimator 21. The cracking detector 23 then estimates whether cracking occurs in the catalyst layers, based on the estimated frequency of strains in the catalyst layers. In summary, the cracking detector 23 estimates whether cracking occurs in the catalyst layers, based on the humidity of the electrolyte membrane estimated by the humidity estimator 21. Prior to description of a specific method of estimating whether cracking occurs in the catalyst layers based on the humidity of the electrolyte membrane, the following describes a mechanism of causing cracks in the catalyst layers.

Figure 2:
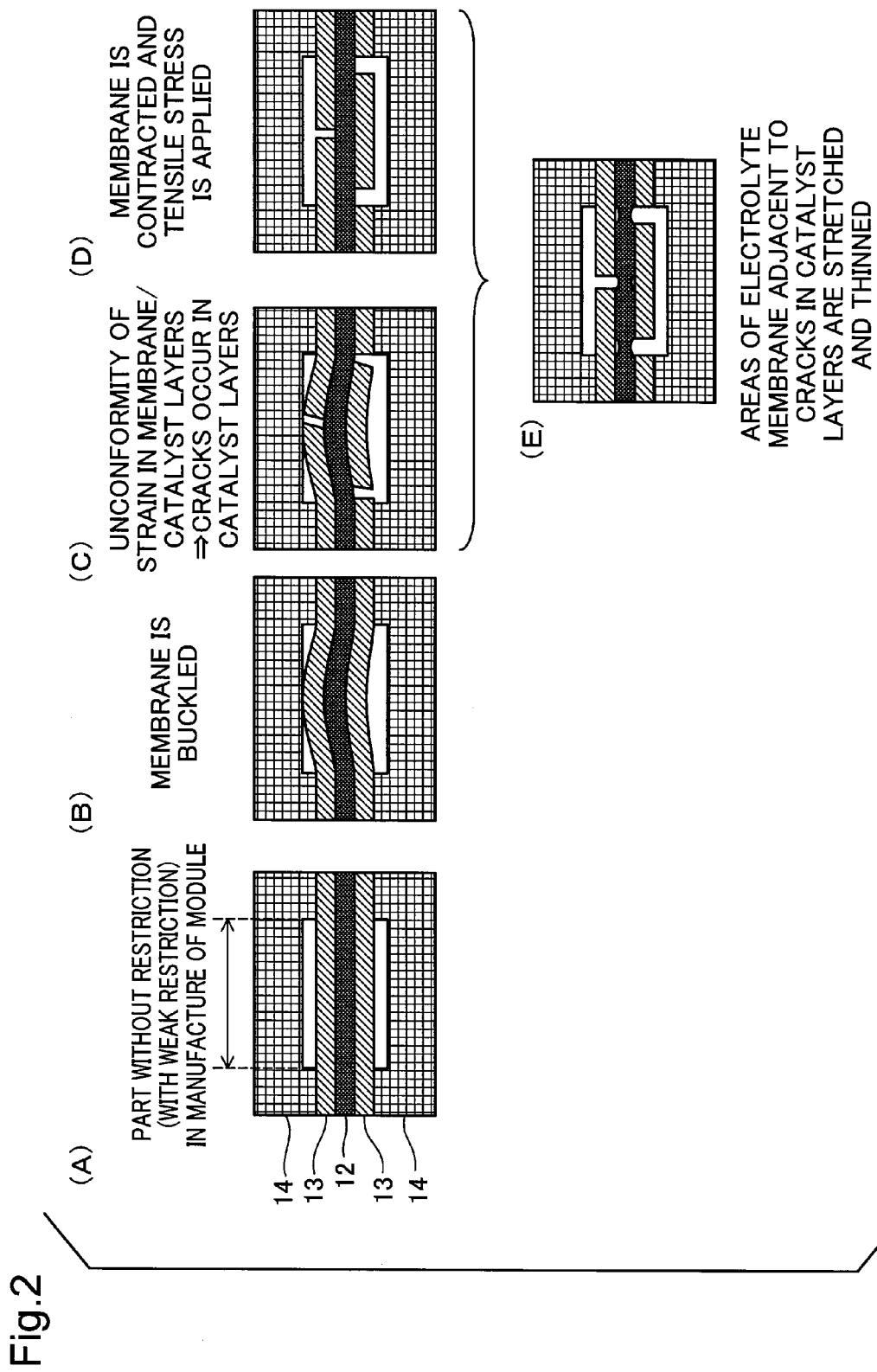
FIG. 2 is diagrams illustrating a mechanism of causing cracks in catalyst layers.

FIG. 2 is diagrams illustrating a mechanism of causing cracks in the catalyst layers. FIG. 2(A) illustrates the power generating element 11 of the fuel cell 10. As described above, the power generating element 11 includes an electrolyte membrane 12 of 5 to 10 μm in thickness, catalyst layers 13 and gas diffusion layers 14. When the electrolyte membrane 12 is swollen during power generation of the electrolyte membrane 12, the electrolyte membrane 12 is stretched and buckled in a part with weak restriction by the gas diffusion layers 14 (or microporous layers) as shown in FIG. 2(B). This leads to strain in the catalyst layers 13 placed on both surfaces of the electrolyte membrane 12, and cracks occur in the catalyst layers 13 as shown in FIG. 2(C). Subsequently, as shown in FIG. 2(D), when the electrolyte membrane 12 is dried and contracted in the state that cracks occur in the catalyst layers 13, tensile stress is applied to specific areas of the electrolyte membrane 12 adjacent to the cracks in the catalyst layers 13. Repeating such swelling and drying of the electrolyte membrane causes the specific areas of the electrolyte membrane 12 adjacent to the cracks in the catalyst layers 13 to be stretched and thinned as shown in FIG. 2(E). Thinning the areas of the electrolyte membrane 12 increases the cross leakage of the gas through the thinned areas. The controller 20 of the embodiment accordingly performs a control process described later to suppress swelling of the electrolyte membrane 12 and thereby suppress the catalyst layers 13 from being cracked and the electrolyte membrane 12 from being stretched and thinned.

The following describes the criterion for determination of whether the electrolyte membrane 12 is swollen.

Figure 3:
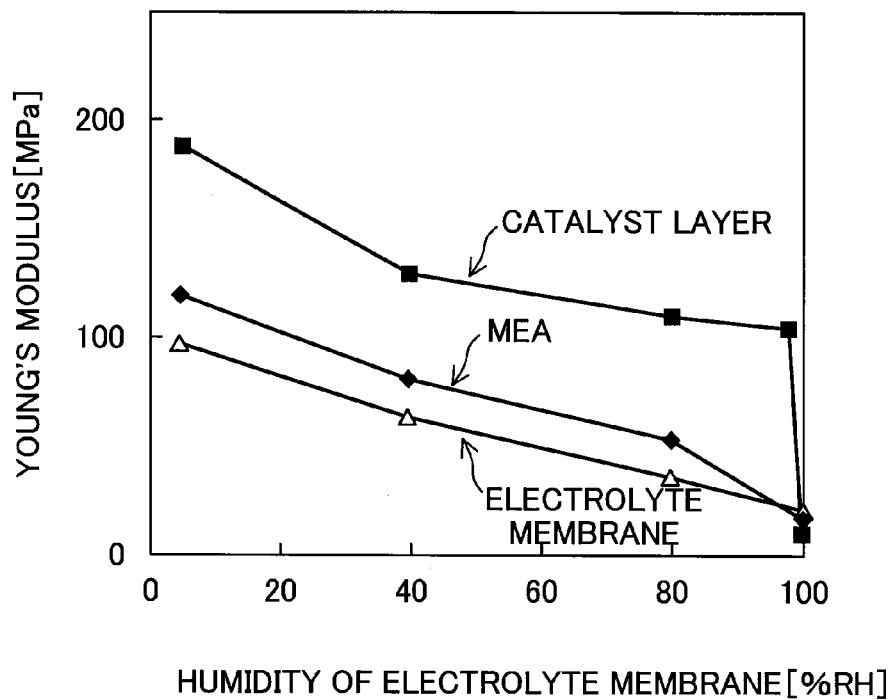
FIG. 3 is a diagram showing measurement results of the Young's modulus of an electrolyte membrane and a catalyst layer.

FIG. 3 is a diagram showing an example of measurement results of the Young's modulus of the electrolyte membrane 12 and the catalyst layer 13. As shown in FIG. 3, in the electrolyte membrane 12, the Young's modulus tends to decrease at a substantially constant rate with an increase in humidity. In the catalyst layer 13, however, the Young's modulus abruptly decreases at the humidity close to the liquid water state, i.e., close to 100% RH. This is attributed to that the electrolyte included in the catalyst layer 13 is swollen with absorption of water to have the high volume ratio and to be softened. Based on such physical property of the catalyst layer 13, stress analysis (simulation) of the catalyst layer 13 accompanied with swelling of the electrolyte membrane 12 was performed to study the relationship between the humidity of the electrolyte membrane 12 and the strain of the catalyst layer 13.

Figure 4:
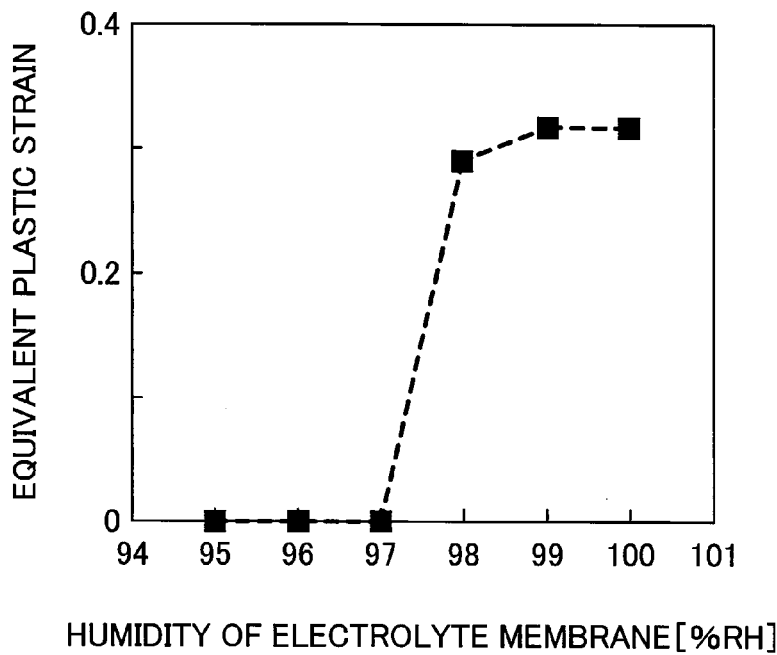
FIG. 4 is a diagram showing the relationship between the humidity of the electrolyte membrane and the equivalent plastic strain in the catalyst layer.
Figure 5:
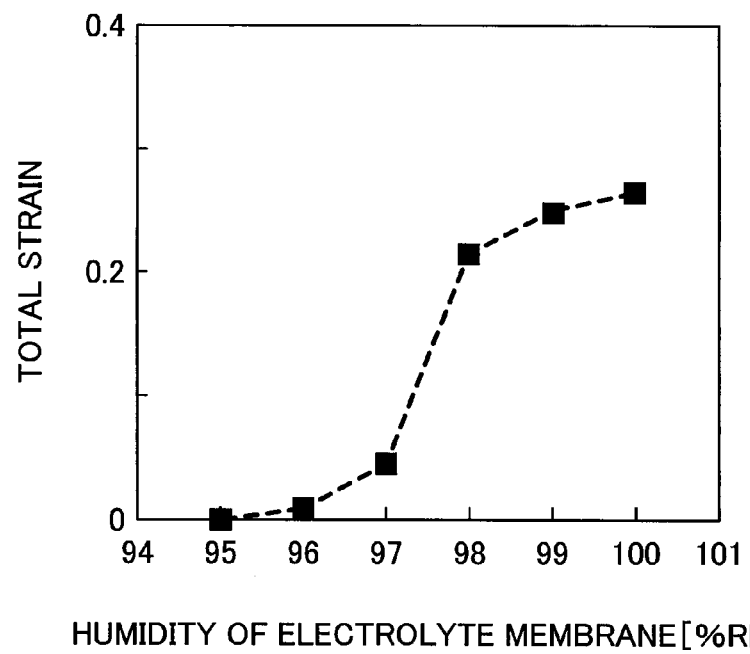
FIG. 5 is a diagram showing the relationship the humidity of the electrolyte membrane and the total strain in the catalyst layer.

FIGS. 4 and 5 are diagrams illustrating the relationships between the humidity of the electrolyte membrane 12 and the strain of the catalyst layer 13. FIG. 4 shows the equivalent plastic strain of the catalyst layer 13 plotted against the humidity of the electrolyte membrane 12. FIG. 5 shows the total strain of the catalyst layer 13 plotted against the humidity of the electrolyte membrane 12. As shown in FIG. 4, at the humidity of the electrolyte membrane 12 of higher than 97% RH, the electrolyte membrane 12 is buckled (see FIG. 2(B)), so that plastic strain is generated in the catalyst layer 13. At the humidity of the electrolyte membrane 12 of not higher than 97% RH, on the other hand, no plastic train is generated. This result well matches with the measurement result of the Young's modulus shown in FIG. 3. Accordingly, the determination of whether strain is generated in the catalyst layer 13, i.e., whether the electrolyte membrane 12 is swollen to such an extent that buckles the electrolyte membrane 12 is based on the determination of whether the humidity of the electrolyte membrane 12 is equal to or higher than 97% RH. The actual electrolyte membrane 12 has a humidity distribution, and the actual humidity may be higher than the estimated humidity in some areas. In this embodiment, the humidity as the criterion for determination of whether the electrolyte membrane 12 is swollen is accordingly set to 95% RH.

As described above, on the simulation, plastic strain of the catalyst layer 13 is not generated at the humidity of the electrolyte membrane 12 of not higher than 97% RH. The total strain is, however, generated even at the humidity of not higher than 97% RH as shown in FIG. 5. This is because the total strain includes not only plastic strain but elastic strain. The following describes the effect of the elastic strain.

Figure 6:
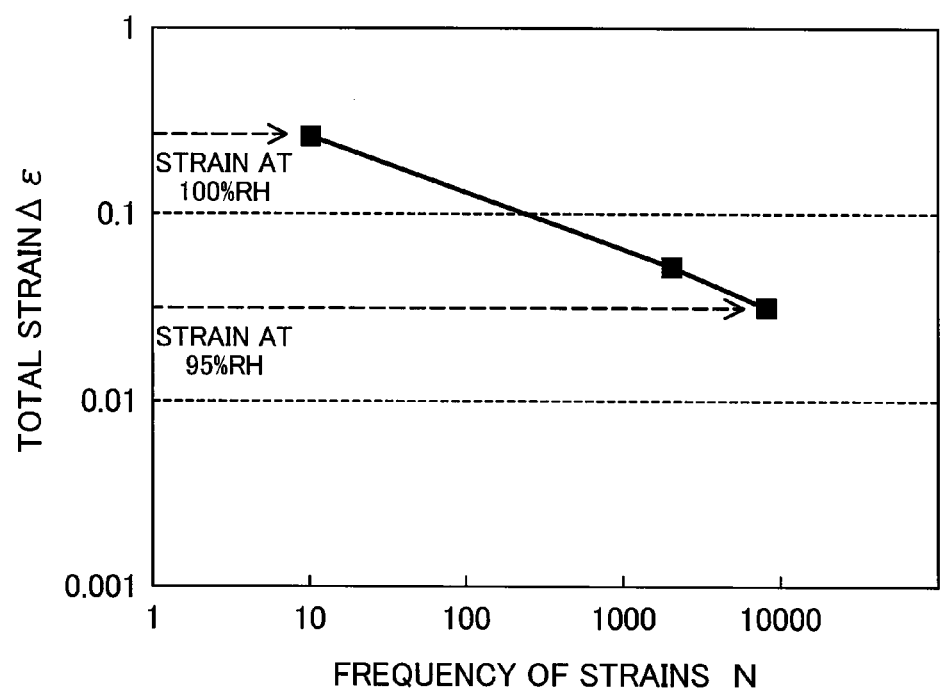
FIG. 6 is a fatigue diagram of the catalyst layer.

FIG. 6 is a fatigue diagram of the catalyst layer 13 with the frequency of strains N causing cracks in the catalyst layer 13 as abscissa and the total strain Δε as ordinate. This fatigue diagram was obtained by performing an experiment under the same environment as the environment providing the analysis results of FIGS. 4 and 5 and measuring the frequency of strains causing cracks in the catalyst layer 13. This fatigue diagram shows that there is a certain relationship between the frequency of strains causing cracks in the catalyst layer 13 and the total strain of the catalyst layer 13. In the illustrated example of FIG. 16, with regard to the total strain corresponding to the humidity of 100% RH, the occurrence of only 10 times causes cracks in the catalyst layer 13. With regard to the total strain corresponding to the humidity of 95% RH, on the other hand, the occurrence of 10000 times causes cracks in the catalyst layer 13. This result shows that repeating the swelling and drying over a long time period causes the catalyst layer 13 to fatigue and have cracks due to the elastic strain even at the humidity of the electrolyte membrane 12 of not higher than 97% RH. The relationship between the total strain and the frequency of strains causing damages is generally expressed by Equation (1) given below.

$$\Delta\epsilon \cdot N_f^\alpha = C \qquad (1)$$

(Δε denotes the total strain, $N_f$ denotes the frequency of strains causing damages, and α and C are constants.)

As described above, the total strain of the catalyst layer 13 depends on the humidity of the electrolyte membrane 12. Accordingly, the cracking detector 23 measures the frequency that the humidity of the electrolyte membrane 12 estimated by the humidity estimator 21 increases to the humidity determined as swelling (97% RH) and estimates that cracking occurs in the catalyst layers 13 when the measured frequency reaches a predetermined threshold value (frequency) based on the fatigue diagram of FIG. 6. The humidity determined as swelling is 97% RH on the simulation but is set to 95% RH in this embodiment as described above. In this embodiment, the cracking detector 23 estimates that cracking occurs in the catalyst layers 13 when the frequency that the humidity of the electrolyte membrane 12 increases to or above 95% reaches the frequency corresponding to 97% RH in FIG. 6.

Figure 7:
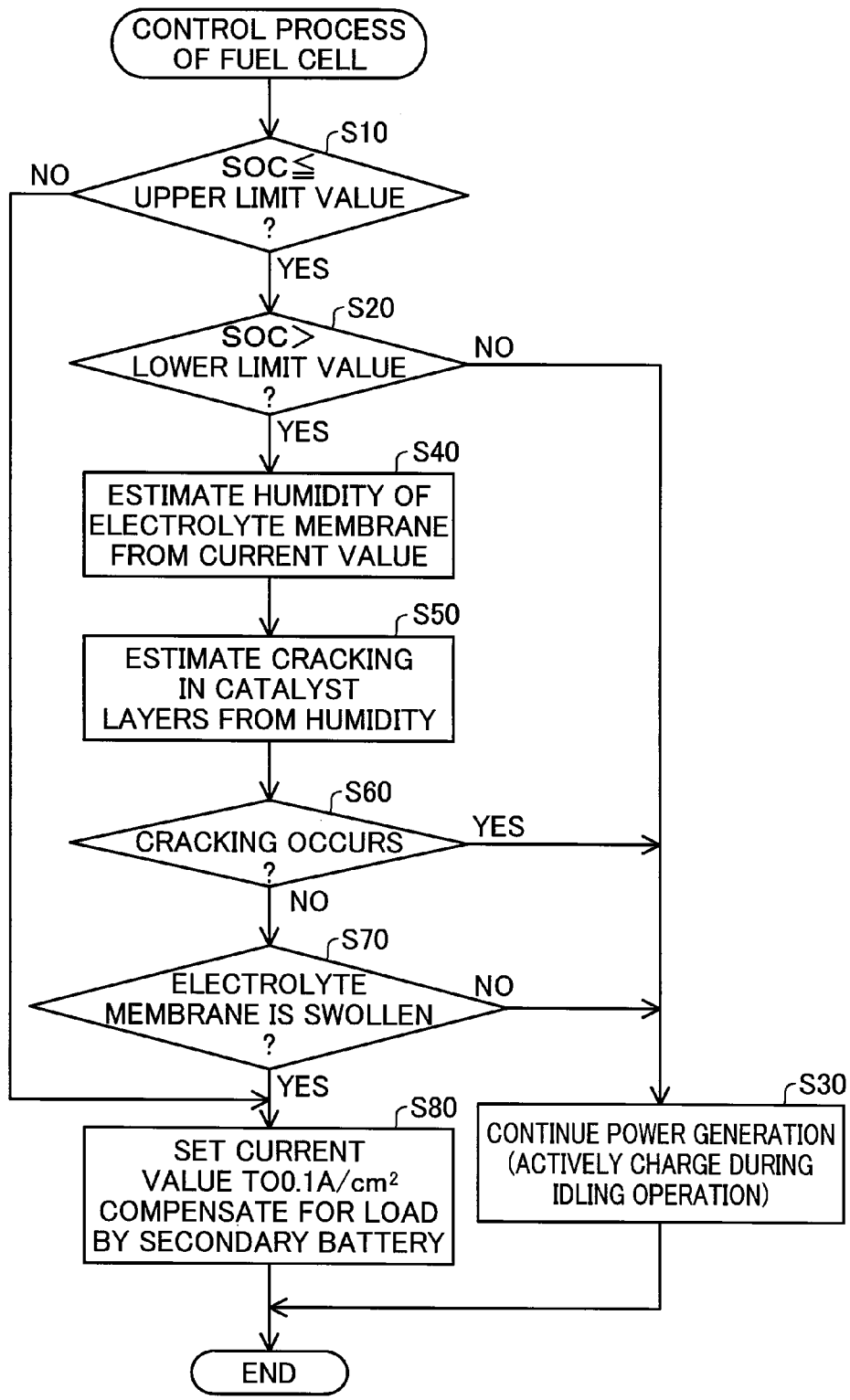
FIG. 7 is a flowchart showing a control process of a fuel cell.

FIG. 7 is a flowchart showing a control process of the fuel cell 10. This control process is repeatedly performed by the controller 20 during operation of the fuel cell system 100. When the control process starts, the controller 20 first determines whether the SOC of the secondary battery 40 is equal to or lower than an upper limit value (step S10). The upper limit value is determined in advance, based on the life and the performance of the secondary battery 40. When the SOC of the secondary battery 40 exceeds the upper limit value (step S10: NO), the controller 20 shifts the process flow to step S80 described later to supply electric power from the secondary battery 40.

When the SOC of the secondary battery 40 is determined to be equal to or lower than the upper limit value (step S10: YES), the controller 20 subsequently determines whether the SOC of the secondary battery 40 is higher than a lower limit value (step S20). The lower limit value may be, for example, 20 to 30%. When the SOC of the secondary battery 40 is determined to be equal to or lower than the lower limit value (step S20: NO), the controller 20 controls the fuel cell 10 to make power generation (step S30). During idling operation, the controller 20 sets the current value of the fuel cell 10 to make a greater amount of power generation than the amount of power required for idling operation and controls the fuel cell 10 to make power generation. This enables surplus electric power which is not used for idling operation to be actively charged into the secondary battery.

When the controller 20 determines that the SOC of the secondary battery 40 is higher than the lower limit value (step S20: YES), the humidity estimator 21 estimates the humidity of the electrolyte membrane 12, based on the current value of the fuel cell 10 (step S40). The cracking detector 23 then estimates the occurrence of cracking in the catalyst layers 13, based on the estimated humidity (step S50). The method of estimating the humidity and the method of estimating the occurrence of cracking have been described above.

When it is estimated that no cracking occurs in the catalyst layers 13 (step S60: NO), the swelling determiner 22 determines whether the electrolyte membrane 12 is swollen (step S70). In this embodiment, the swelling determiner 22 determines that the electrolyte membrane 12 is swollen when the humidity estimated at step S40 is equal to or higher than 95% RH. In other words, the procedure of this embodiment determines that the electrolyte membrane 12 is swollen not only at the high humidity of 99 to 100% RH that generally provides the swelling state but even at the relatively lower humidity of 95 to 98% RH. When the swelling determiner 22 determines that the electrolyte membrane 12 is swollen (step S70: YES), the power generation reducer 24 sets the current value (current density) of the fuel cell to 0.1 A/cm$^2$, which is the current value lower than the current value before the determination that the electrolyte membrane 12 is swollen (i.e., the current value at the humidity of the electrolyte membrane 12 of lower than 95%), in order to reduce the amount of power generation (step S80). The processing of this step S80 reduces the amount of power generation by the fuel cell 10 when it is estimated that the electrolyte membrane 12 is swollen. This accelerates drying of the electrolyte membrane 12 and results in suppressing the occurrence of cracking in the catalyst layers 13 shown in FIG. 2(C). The controller 20 also controls the secondary battery 40 to supply and compensate for the deficient electric power due to reduction of the amount of power generation by the fuel cell 10. In this embodiment, the surplus electric power is accumulated in the secondary battery 40 during the idling operation at step S30 described above. Even when the amount of power generation by the fuel cell 10 is reduced at step S80, the deficiency can thus be compensated by the supply from the secondary battery 40. The current value set at step S80 is not 0 A/cm$^2$. This avoids a high potential of the fuel cell 10 and suppresses deterioration of the catalyst such as platinum.

When it is determined at step S70 that the electrolyte membrane 12 is not swollen (step S70: NO), the controller 20 shifts the process flow to step S30 described above to continue power generation by the fuel cell 10. At step S30, the fuel cell 10 actively makes power generation during the idling operation to charge the surplus electric power into the secondary battery 40 as described above.

When it is estimated at step S50 that cracking occurs in the catalyst layers 13 (step S60: YES), the controller 20 shifts the process flow to step S30, regardless of whether the electrolyte membrane 12 is swollen. In the state that cracking occurs in the catalyst layers 13, drying the electrolyte membrane 12 causes part of the electrolyte membrane 12 to be stretched and thinned as shown in FIG. 3(E) and may increase the cross leakage. Accordingly, when it is estimated that cracking occurs in the catalyst layers 13, the controller 20 controls the fuel cell 10 to actively make power generation, in order to swell the electrolyte membrane 12 as much as possible and prevent a stretch of the electrolyte membrane 12.

The fuel cell system 100 of the embodiment described above employs the thin electrolyte membrane 12 of 5 to 10 μm in thickness, so that the electrolyte membrane 12 is swollen and buckled even at the relatively low humidity of 94 to 98% RH. When it is estimated that the electrolyte membrane 12 is swollen, the control of this embodiment reduces the amount of power generation by the fuel cell 10, in order to dry the electrolyte membrane 12. This suppresses all the deformation of the electrolyte membrane 12 caused by swelling of the thin electrolyte membrane 12 (see FIG. 2(B)), the cracking in the catalyst layers 13 due to deformation of the electrolyte membrane 12 (see FIG. 2(C)), the stretch of the electrolyte membrane 12 due to cracking in the catalyst layers 13 (FIG. 2(E)) and the occurrence of cross leakage due to stretch of the electrolyte membrane 12 (FIG. 2(E)). As a result, the thin electrolyte membrane 12 can be employed for the fuel cell 10. This allows for downsizing and cost reduction of the fuel cell 10. The embodiment causes the electric power to be supplied from the secondary battery 40 which has actively been charged with the surplus electric power and thus enables the required amount of electric power to be adequately supplied even when the amount of power generation by the fuel cell 10 is reduced.

The embodiment takes into account the humidity distribution of the electrolyte membrane 12 and determines that the electrolyte membrane 12 is swollen when the humidity of the electrolyte membrane is equal to or higher than 95% RH. This ensures adequate determination of whether the electrolyte membrane 12 is swollen. The humidity as the criterion for determination of swelling or non-swelling is not limited to 95% RH but may be any other suitable value depending on the properties and the durability of the fuel cell 10.

The embodiment does not use a humidity sensor or the like but estimates the humidity of the electrolyte membrane 12 based on the current value of the fuel cell. This simplifies the system configuration.

When it is determined that the electrolyte membrane 12 is swollen, the embodiment sets the current value for power generation by the fuel cell 10 to 0.1 A/cm². This enables the electrolyte membrane 12 to be quickly dried, while suppressing the fuel cell 10 having an unnecessarily high potential. The current value is not limited to 0.1 A/cm² but may be any other suitable current value that suppresses power generation while avoiding a high potential of the fuel cell 10.

When it is estimated that cracking occurs in the catalyst layers 13, the embodiment controls the fuel cell 10 to make power generation, regardless of whether the electrolyte membrane 12 is swollen. In other words, when it is estimated that cracking occurs in the catalyst layers 13, the embodiment controls the fuel cell 10 to make power generation even in the state that the electrolyte membrane 12 has already been swollen. When it is determined that the electrolyte membrane 12 is swollen, the embodiment performs control, in principle, to dry the electrolyte membrane 12, so as to suppress the occurrence of cracking in the catalyst layers. As shown in FIG. 6, however, the elastic strain may cause cracks in the catalyst layers 13 even at the humidity lower than the humidity at which it is determined that the electrolyte membrane 12 is swollen. When it is estimated that cracking occurs in the catalyst layers 13, even in the state that the electrolyte membrane 12 is swollen, the fuel cell 10 is controlled to make power generation and thereby continue the swelling state. Keeping the electrolyte membrane 12 swollen suppresses the electrolyte membrane 12 from being dried and thereby being stretched and thinned as shown in FIG. 2(E). This results in suppressing the occurrence of cross leakage in the electrolyte membrane 12.

The embodiment estimates the humidity of the electrolyte membrane 12 based on the current value of the fuel cell 10, measures the frequency of strains in the catalyst layers 13 based on the estimated humidity, and estimates the occurrence of cracking in the catalyst layers 13 based on the frequency. In other words, both the swelling of the electrolyte membrane 12 and the cracking in the catalyst layers 13 can be estimated based on the current value of the fuel cell 10. This does not require individual sensors and simplifies the system configuration.

The invention is not limited to the above embodiment but may be implemented by the following modification.

The above embodiment reduces the current value (amount of power generation) of the fuel cell 10 at step S80 in FIG. 7, in order to decrease the humidity of the electrolyte membrane 12. A modified control may increase the temperature of the fuel cell 10, while keeping the current value unchanged. Another modified control may decrease the back pressure of the cathode, while keeping the current value unchanged. Yet another modified control may decrease the stoichiometric value at the anode, while keeping the current value unchanged. These modified controls can also decrease the humidity of the electrolyte membrane 12. The technique of reducing the amount of power generation of the fuel cell 10 as described in the above embodiment, however, decreases the humidity of the electrolyte membrane 12 more quickly than the other techniques, thus suppressing the occurrence of cross leakage quickly.

When it is estimated that the humidity of the electrolyte membrane 12 is equal to 95% RH, the control of the above embodiment immediately reduces the current value. A modified control may reduce the current value when the humidity of the electrolyte membrane 12 is estimated to be continuously equal to or higher than 95% RH for a predetermined time (for example, 5 seconds).

The above embodiment estimates the humidity of the fuel cell 10, the strains in the catalyst layers 13 and the cracking in the catalyst layers 13, based on the current value of the fuel cell 10. Individual sensors may, however, be used to detect these factors.

In the above embodiment, the thickness of the electrolyte membrane 12 is 5 to 10 μm. The thickness of the electrolyte membrane 12 is, however, not limited to this range but may be set to any of various other thickness ranges.

The processing of step S60 in FIG. 7 of the above embodiment is not essential. More specifically, the process of continuing power generation on the occurrence of cracking in the catalyst layers 13 may be omitted. In this modification, the process of estimating whether cracking occurs (step S50) may also be omitted.

In the above embodiment, the amount of power generation by the fuel cell 10 may be controlled by the current value or may be controlled by the voltage.

The invention is not limited to any of the embodiments, the examples and the modifications described herein but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST

10 Fuel cell
11 Power generating element
12 Electrolyte membrane
13 Catalyst layer
14 Gas diffusion layer
15 Current sensor
20 Controller
21 Humidity estimator
22 Swelling determiner
34 Cracking detector
24 Power generation reducer
30 DC line
40 Secondary battery
45 SOC detector
50 DC-DC converter
60 DC-AC inverter
100 Fuel cell system
200 Motor

The invention claimed is:

1. A fuel cell system, comprising:
a current sensor;
an electrolyte membrane included in a fuel cell and formed to have a thickness of 5 to 10 μm;
a controller including a computer and memory, the controller programmed to:
control an amount of power generation by the fuel cell according to a required amount of electric power;
estimate the humidity of the electrolyte membrane based on a current value of the fuel cell measured by the current sensor;
estimate whether there is cracking in a catalyst layer of the fuel cell based on a frequency that the humidity of the electrolyte membrane has increased to a humidity threshold value;
reduce the amount of power generation by the fuel cell to be higher than 0 and to be lower than the amount of power generation at the humidity of the electrolyte membrane of lower than 95% RH when the estimated humidity of the electrolyte membrane is 95 to 98% RH and no cracking is detected;

control an amount of electric power to be supplied from a secondary battery, while controlling the amount of power generation by the fuel cell, according to the required amount of electric power, and when the power generation reducer reduces the amount of power generation by the fuel cell, the controller controls the secondary battery to supply a deficient amount of electric power in the required amount of electric power, which is made deficient by reducing the amount of power generation.

2. The control device for the fuel cell according to claim 1, wherein the power generation reducer sets a value of electric current for power generation of the fuel cell to 0.1 A/cm², in order to reduce the amount of power generation of the fuel cell.

3. A control method of a fuel cell, comprising:

controlling an amount of power generation by the fuel cell according to a required amount of electric power with a controller having a computer and memory;

estimating the humidity of an electrolyte membrane included in the fuel cell based on a current value of the fuel cell measured by the current sensor;

estimating whether there is cracking in a catalyst layer of the fuel cell based on a frequency that the humidity of the electrolyte membrane has increased to a humidity threshold value;

reducing the amount of power generation by the fuel cell to be higher than 0 and to be lower than the amount of power generation at the humidity of the electrolyte membrane of lower than 95% RH when the estimated humidity of the electrolyte membrane, of 95 to 98% RH and no cracking is detected;

control an amount of electric power to be supplied from a secondary battery, while controlling the amount of power generation by the fuel cell, according to the required amount of electric power, and when the power generation reducer reduces the amount of power generation by the fuel cell, the controller controls the secondary battery to supply a deficient amount of electric power in the required amount of electric power, which is made deficient by reducing the amount of power generation.

* * * * *